United States Patent
Singh

(10) Patent No.: US 10,248,441 B2
(45) Date of Patent: Apr. 2, 2019

(54) REMOTE TECHNOLOGY ASSISTANCE THROUGH DYNAMIC FLOWS OF VISUAL AND AUDITORY INSTRUCTIONS

(71) Applicant: International Business Machines Corporation, Armonk, NY (US)

(72) Inventor: Alok K. Singh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 15/226,619

(22) Filed: Aug. 2, 2016

(65) Prior Publication Data

US 2018/0039502 A1  Feb. 8, 2018

(51) Int. Cl.
| | |
|---|---|
| G06F 9/451 | (2018.01) |
| G06F 3/16 | (2006.01) |
| G06F 17/27 | (2006.01) |
| G06F 3/0481 | (2013.01) |
| G06F 17/28 | (2006.01) |
| G06F 3/0488 | (2013.01) |

(52) U.S. Cl.
CPC ............ G06F 9/453 (2018.02); G06F 3/0481 (2013.01); G06F 3/0488 (2013.01); G06F 3/167 (2013.01); G06F 17/275 (2013.01); G06F 17/289 (2013.01)

(58) Field of Classification Search
CPC ...... G06F 9/453; G06F 3/0481; G06F 3/0484; G06F 3/167; G06F 9/4446; G06F 17/275
See application file for complete search history.

(56) References Cited

U.S. PATENT DOCUMENTS

| | | | |
|---|---|---|---|
| 6,955,541 B2 | 10/2005 | Macri et al. | |
| 2002/0118220 A1 | 8/2002 | Lui et al. | |
| 2005/0256825 A1* | 11/2005 | Dettinger | G06F 17/3056 |
| 2007/0015118 A1* | 1/2007 | Nickell | G09B 5/02 |
| | | | 434/118 |
| 2007/0143103 A1* | 6/2007 | Asthana | H04M 3/567 |
| | | | 704/200 |
| 2008/0288865 A1* | 11/2008 | Raffel | G06F 9/453 |
| | | | 715/709 |
| 2011/0258526 A1* | 10/2011 | Supakkul | G06F 17/241 |
| | | | 715/230 |
| 2012/0110472 A1* | 5/2012 | Amrhein | G06F 17/30873 |
| | | | 715/753 |
| 2013/0093829 A1 | 4/2013 | Rosenblatt et al. | |
| 2014/0176661 A1* | 6/2014 | Smurro | G06T 9/001 |
| | | | 348/14.06 |
| 2014/0258889 A1* | 9/2014 | Badge | G06F 17/30873 |
| | | | 715/760 |
| 2014/0379816 A1* | 12/2014 | Lin | H04L 51/24 |
| | | | 709/206 |

(Continued)

*Primary Examiner* — Mandrita Brahmachari
(74) *Attorney, Agent, or Firm* — Patterson + Sheridan, LLP

(57) ABSTRACT

Systems, methods, and computer program products to perform an operation comprising receiving, by a first device, metadata describing a first action of a plurality of actions performed on a second device, identifying a target object of the first action based on the metadata describing the first action, and outputting, by the first device: a sequence of images depicting performance of the first action on the second device, a textual instruction specifying how to perform the first action on the first device proximate to the target object, and an audio instruction specifying how to perform the first action on the first device.

20 Claims, 7 Drawing Sheets

(56) References Cited

U.S. PATENT DOCUMENTS

2016/0180352 A1* 6/2016 Chen ................ G06Q 30/0201
                                                   705/7.29
2016/0246769 A1* 8/2016 Screen ................ G06F 17/243
2017/0142047 A1* 5/2017 Mendiola ................ H04L 51/12

* cited by examiner

REMOTE TECHNOLOGY ASSISTANCE THROUGH DYNAMIC FLOWS OF VISUAL AND AUDITORY INSTRUCTIONS

BACKGROUND

The present invention relates to computer software, and more specifically, to computer software which provides remote technology assistance through dynamic flows of visual and auditory instructions.

Users often have difficulty using computers and related technology. As a result, many people cannot enjoy the benefits provided by computer technology in everyday life. While some users can learn via documentation and other tutorials provided by hardware and software providers, these tools are static in nature, and often do not cover all possible use cases. In fact, many users cannot learn how to use technology via these tools. Instead, these users require personal, focused assistance to learn. Such personal assistance is time consuming and energy intensive. Furthermore, users have different paces of learning and best modes of learning, rendering a "one-size fits all" assistance approach as relatively ineffective.

SUMMARY

In one embodiment, a method comprises receiving, by a first device, metadata describing a first action of a plurality of actions performed on a second device, identifying a target object of the first action based on the metadata describing the first action, and outputting, by the first device: a sequence of images depicting performance of the first action on the second device, a textual instruction proximate to the target object, wherein the textual instruction specifies how to perform the first action on the first device, and an audio instruction specifying how to perform the first action on the first device.

In another embodiment, a system comprises a processor and a memory storing instructions, which when executed by the processor, performs an operation comprising receiving, by the system, metadata describing a first action of a plurality of actions performed on a first device, identifying a target object of the first action based on the metadata describing the first action, and outputting, by the system: a sequence of images depicting performance of the first action on the first device, a textual instruction proximate to the target object, wherein the textual instruction specifies how to perform the first action on the system, and an audio instruction specifying how to perform the first action on the system.

In another embodiment, a computer-readable storage medium has computer-readable program code embodied therewith, the computer-readable program code executable by a processor to perform an operation receiving, by a first device, metadata describing a first action of a plurality of actions performed on a second device, identifying a target object of the first action based on the metadata describing the first action, and outputting, by the first device: a sequence of images depicting performance of the first action on the second device, a textual instruction proximate to the target object, wherein the textual instruction specifies how to perform the first action on the first device, and an audio instruction specifying how to perform the first action on the first device.

DETAILED DESCRIPTION

Embodiments disclosed herein allow users to remotely assist other users to learn how to use computer technology, such as software applications, operating systems, hardware features, peripheral devices, and the like. Generally, a first user may perform a series of actions on a first computing device to help another second user learn how to perform the series of operations on a second computing device. Embodiments disclosed herein may record the series of actions as they appear on the display of the first computing device (e.g., a screen capture of the display of the first computing device), and capture metadata describing each action on the first computing device. The metadata and recorded series of operations on the display may be transmitted to the second device to assist the second user. In at least one embodiment, related operations are grouped together and sent to the second device. Once received on the second device, a tutorial describing the series of actions may be outputted to show the second user how to perform the series of actions. The tutorial outputted on the second device may include audio and visual components, such as a text-to-speech conversion of each step of the process and a step-by-step visual tutorial of each action performed by the first user.

If the series of actions are specific to the first device (e.g., are not directly compatible with the second device), embodiments disclosed herein may translate the series of actions to a format compatible with the second device. Furthermore, if the first and second users do not speak the same language, embodiments disclosed herein may provide the tutorials in a language understood by the second user.

Figure 1A:
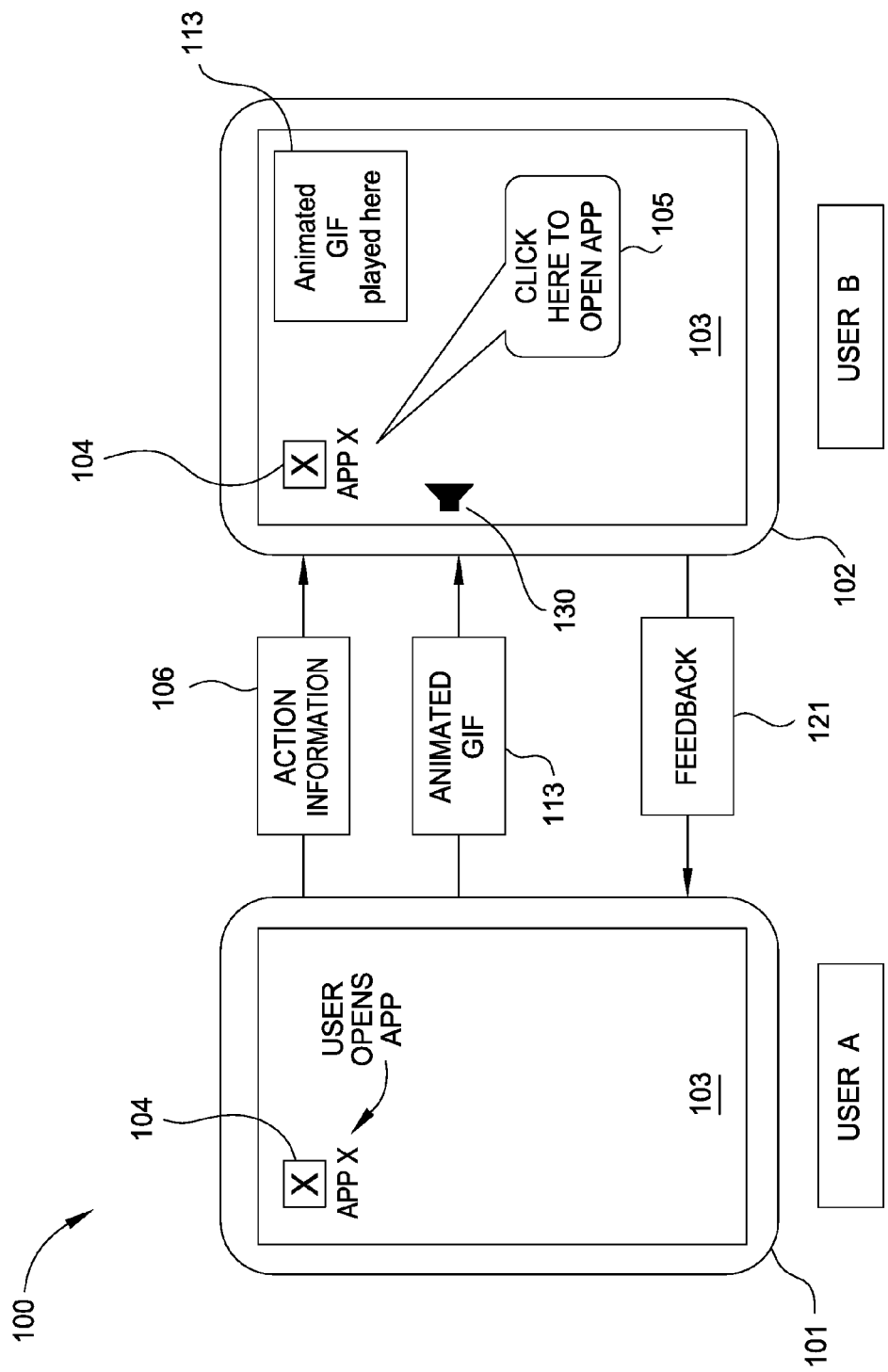
FIGS. 1A-1C illustrate an example system which provides remote technology assistance through a dynamic flow of visual and auditory instructions, according to various embodiments.

FIG. 1A illustrates an example system 100 which provides remote technology assistance through a dynamic flow of visual and auditory instructions, according to various embodiments. As shown, the system 100 includes two computing devices 101, 102. The computing devices 101, 102 are representative of any type of computing device, such as a desktop computer, laptop computer, smartphone, tablet computer, portable gaming device, and the like. Generally, a user of the computing device 101 may assist the user of computing device 102. FIG. 1A depicts an example action (or operation) performed in the assistance process, where the user of the computing device 101 opens an application by clicking an icon 104 depicted on a display 103 of the computing device 101.

When the user clicks the icon 104, the computing device 101 captures the event, and generates the action information 106. The action information 106 includes metadata describing the captured event (e.g., navigating to the screen where the icon 104 is present, and the user clicking on the icon 104 to open the application). The action information 106 may include actual system calls (e.g., events, function calls, event handlers, and the like) performed by the operating system (not pictured) of the computing device 101, as well as metadata describing each action performed by the operating system. For example, the metadata may describe the icon 104, which may include a name of the icon, a target application, textual and/or voice input describing how to perform the action, and other associated metadata. The computing device 101 may then transmit the generated action information 106 to the computing device 102 via a network (not pictured).

As part of the assistance process, the computing device 101 may record the output of the display 103, such as when the user navigates to the screen where the icon 104 is located, and the user clicking on the icon 104. The computing device 101 may generate an animated graphics interchange format (GIF) file 113 depicting the steps performed on the computing device 101. Although a GIF is used herein as a reference example, a video or other sequence of images may be used. The computing device 101 may then transmit the GIF 113 to the computing device 102. The computing device 102 may then continuously loop the animated GIF 113 on the display 103 to show the user of the computing device 102 the actual steps performed by the user of the computing device 101 to open the application.

In some embodiments, the action information 106 is specific to the computing device 101, and not compatible with the computing device 102. For example, the computing device 101 may execute a different operating system than the computing device 102, and the platform-specific system calls stored in the action information 106 may not be understood by the operating system of the computing device 102. In such embodiments, the action information 106 needs to be translated to a format compatible with the computing device 101. Therefore, the computing device 101, the computing device 102, and/or a server (not pictured) may translate the action information 106 to a format compatible with the computing device 102 based on one or more translation rules.

Once the action information 106 is compatible with the computing device 102, a series of visual and auditory assistive cues may be generated for output on the display 103 of the computing device 102. Generally, the computing device 102 may process the action information to identify the icon 104 on the computing device 102, and output the icon 104 on the display 103. In addition, the computing device 102 may identify the step of opening the application associated with the icon 104 in the action information 106, and generate an indication conveying that the user of the second computing device needs to select the icon 104 to open the associated application. As shown, the computing device 102 has generated a text bubble 105 which is outputted on the display 103, and instructs the user to "click here to open app." As previously indicated, the assisting user may provide the text specifying to "click here to open app." By identifying the icon 104, and outputting the text bubble 105, the user of the second device may be able to open the desired application.

Furthermore, as shown, the computing device 102 outputs a sound clip 130 via a speaker (not pictured) to further assist the user. Generally, in the example depicted in FIG. 1A, the sound clip 130 is an auditory instruction which tells the user to select the icon 104 to open the associated application. In at least one embodiment, the user of the computing device 101 may speak instructions for the user of the computing device 102, which are recorded and stored as the sound clip 130. In other embodiments, one or more of the computing devices 101, 102 (or a different computing device) may generate the sound clip 130 based on the actions described in the action information 106. For example, the action information 106 (and/or the text of the text bubble 105) may be converted to speech using a text-to-speech algorithm. As another example, the computing device 102 may store a plurality of sound clips that are enriched with metadata. The computing device 102 may match metadata of the action information 106 to the metadata of the stored sound clips to select and output appropriate auditory instructions.

Therefore, as shown in FIG. 1A, the user of the computing device 102 has the text bubble 105, the animated GIF 113, and the sound clip 130 to assist them in opening the application associated with icon 104. In the event that the user of the computing device 102 speaks a different language than the user of computing device 101 (or is more comfortable with a different language than the language used by the user of computing device 101), the text outputted in the text bubble 105 and the speech outputted as part of the sound clip 130 may be converted to a different language. Doing so allows users to receive assistance in a preferred language of their choosing (which may be specified in a user profile associated with each user).

As shown, the computing device 102 may transmit feedback 121 to the computing device 101. The feedback 121 may specify whether the user of the computing device 102 was able to perform the actions specified in the action information 106 (e.g., whether the user opened the application by clicking the icon 104). If the user does not successfully perform the actions, the user of computing device 101 may create additional textual and/or auditory instructions to assist the user. These new instructions may be transmitted to the computing device 102 and outputted to the user as described above. If the user correctly performs the actions, the user of the computing device 101 may continue to perform additional actions to assist the user of computing device 102.

In some embodiments, an "offline" tutorial session may be implemented, where the user of the computing device 101 performs all of the required actions at once. In such embodiments, the actions may be grouped into related actions, and the associated assistance tools (e.g., the text bubble 105, the animated GIF 113, and the sound clip 130) may be outputted as the user of the computing device 102 successfully completes each group of actions. Once the user completes a group of actions, the next set of assistive tools may be "unlocked" and outputted on the computing device 102 to help the user complete the remaining actions.

Figure 1B:
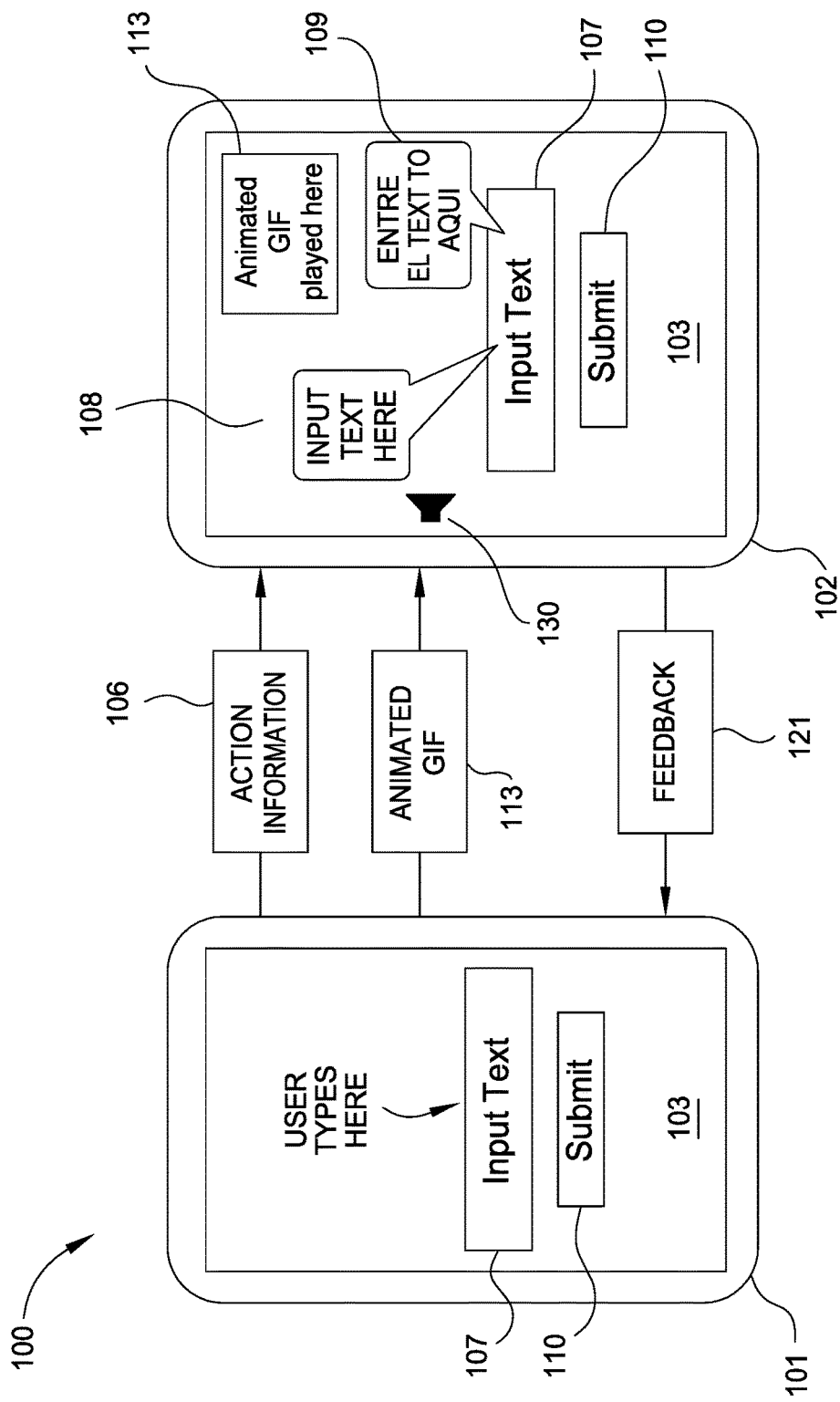

FIG. 1B illustrates an embodiment where the user of the computing device 102 has successfully opened the application associated with the icon 104. As shown, the display 103 of device 101 now depicts an input text box 107 and a submit button 110 as part of a graphical user interface (GUI) of the opened application. The user of the computing device 101 may then select the text box 107 and provide text input to the text box 107. The computing device 101 may capture each of these actions, and generate corresponding action information 106. The action information 106 may therefore include event information from the application (e.g., an application call to activate the text box 107) and operating system calls (e.g., event handlers to display a keyboard and provide text input). Furthermore, the computing device 101 may continue to capture the output of the display 103, and generate the animated GIF 113 which includes the latest actions performed by the user of the computing device 101 (e.g., selecting text box 107 and typing in the text box 107).

The computing device 101 may again transmit the action information 106 and the animated GIF 113 to the computing device 102.

As shown, the display 103 of the computing device 102 includes the input text box 107 and the submit button 110 of the GUI of the opened application. The display 103 also includes two text bubbles 108, 109. The text bubbles 108, 109 may again be generated based on the updated action information 106. As shown, the text bubble 108 instructs the user of the computing device 102 to "Input Text Here," while the text bubble 109 includes a Spanish translation of the text in the text bubble 108. In at least one embodiment, however, only one of the text bubbles 108, 109 may be outputted to the user. In at least one embodiment, the action information 106 includes a tooltip associated with the text box 107. The tooltip may include instructions that are outputted when the user hovers their mouse over an object (e.g., the text box 107). The tooltip information may be leveraged to assist the user, for example, in generating the text of the text bubble 108.

Furthermore, the computing device 102 may again output a sound clip 130 which generally instructs the user to input text in the text box 107. As in FIG. 1A, the sound clip 130 may be selected from a stored library of sound clips, generated by the user of computing device 101, or generated based on a text-to-speech conversion of the text of text boxes 108, 109.

As in FIG. 1A, the computing device 101 may send feedback 121 to the computing device 120. The feedback 121 may indicate whether the user of computing device has successfully completed the actions in the action information 106 (e.g., activated the text box 107 and entered text in the text box 107). The computing device 101 may use any means to determine whether the user has successfully completed the actions, such as by recording system calls made by the application, examining objects on a system stack, and analyzing image data of a screenshot (to determine whether text exists in the text box).

Figure 1C:
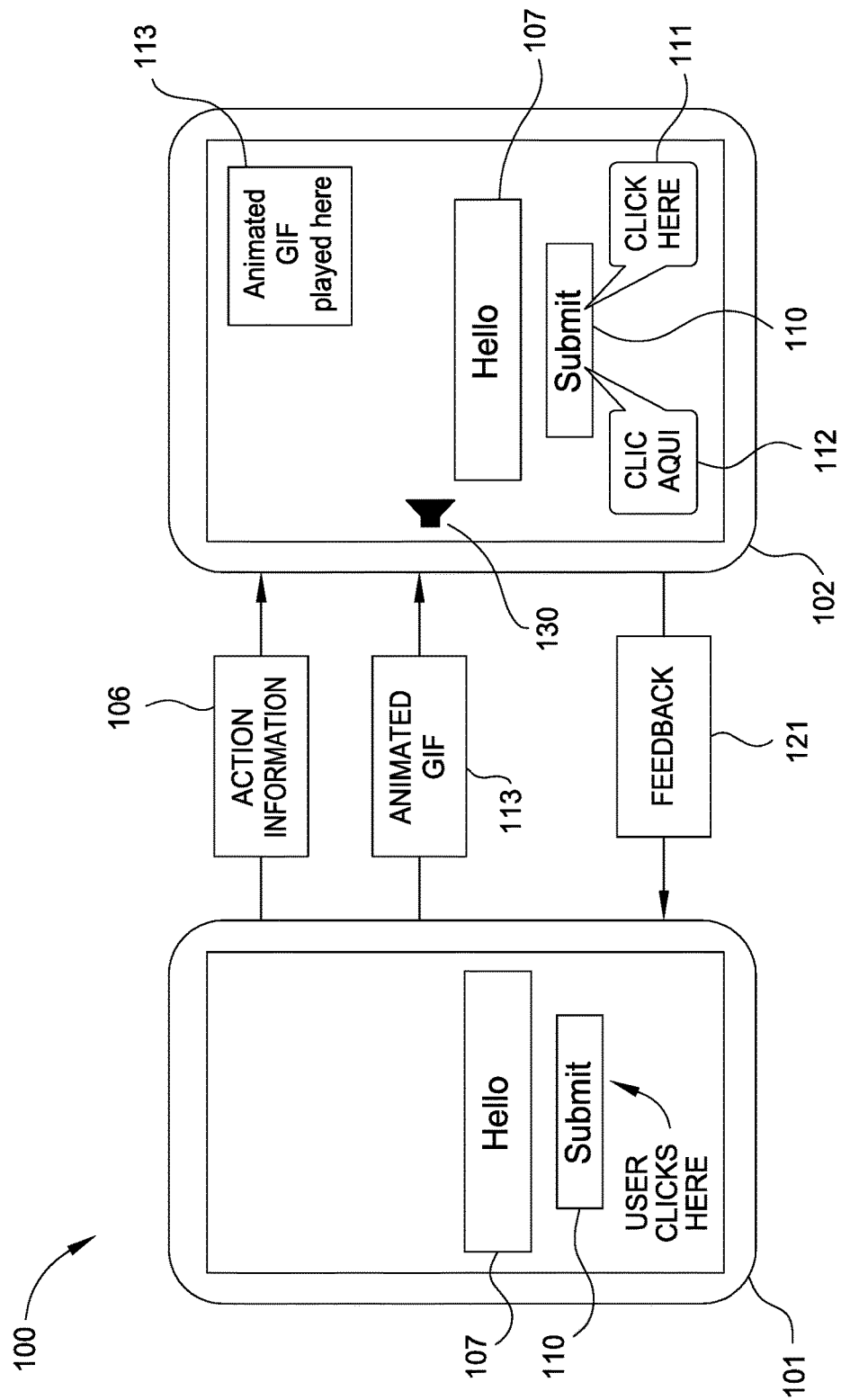

FIG. 1C depicts an embodiment where the user of computing device 102 has successfully entered text into the text box 107. As shown, the user of computing device 101 may then click on the submit button 110 to submit the input to the application for further processing. The computing device 101 may record the user's action of clicking the submit button 110 to generate an updated animated GIF 113, which visually depicts the action of clicking the submit button 110. The updated animated GIF 113 may then be transmitted to the computing device 102, where it is again outputted on the display 103 to assist the user of computing device 102.

As shown, the computing device 101 also generates updated action information 106 describing the click of the submit button 110. The updated action information 106 may specify attributes of the submit button 110 (e.g., an object name, type, and other parameters) that the computing device 102 may use to properly identify the submit button 110, in the event there are multiple objects outputted on the displays 103 by the application. In the event that the user of computing device 102 has navigated away from the application including the submit button 110, the computing device 102 may use the attributes stored in the action information 106 to identify the correct application, and display the application (and the submit button 110) on the display 103.

As shown, the computing device 102 may generate and output text bubbles 111, 112 specifying to click the submit button 110. Furthermore, the computing device 102 may output a sound clip 130 which generally instructs the user to click the submit button 110 to submit the text they entered in text box 107. The sound clip 130 may include instructions in a plurality of different languages. Additionally, the computing device 102 outputs the animated GIF 113 showing the user clicking the submit button 110. In at least one embodiment, the animated GIF 113 is cumulative in that all of the previous actions performed by the user of the computing device 101 are depicted.

As in FIGS. 1A-1B, the computing device 102 may track the actions of the user, and send feedback to the computing device 101. If the user successfully completed the actions included in the action information 106, the user of computing device 101 may perform any additional actions to assist the user. In the "offline" embodiment, the computing device 102 may determine whether more actions are stored in the action information 106. If more actions remain, the computing device 102 may output the next set of instructional tools on the display 103.

Figure 2:
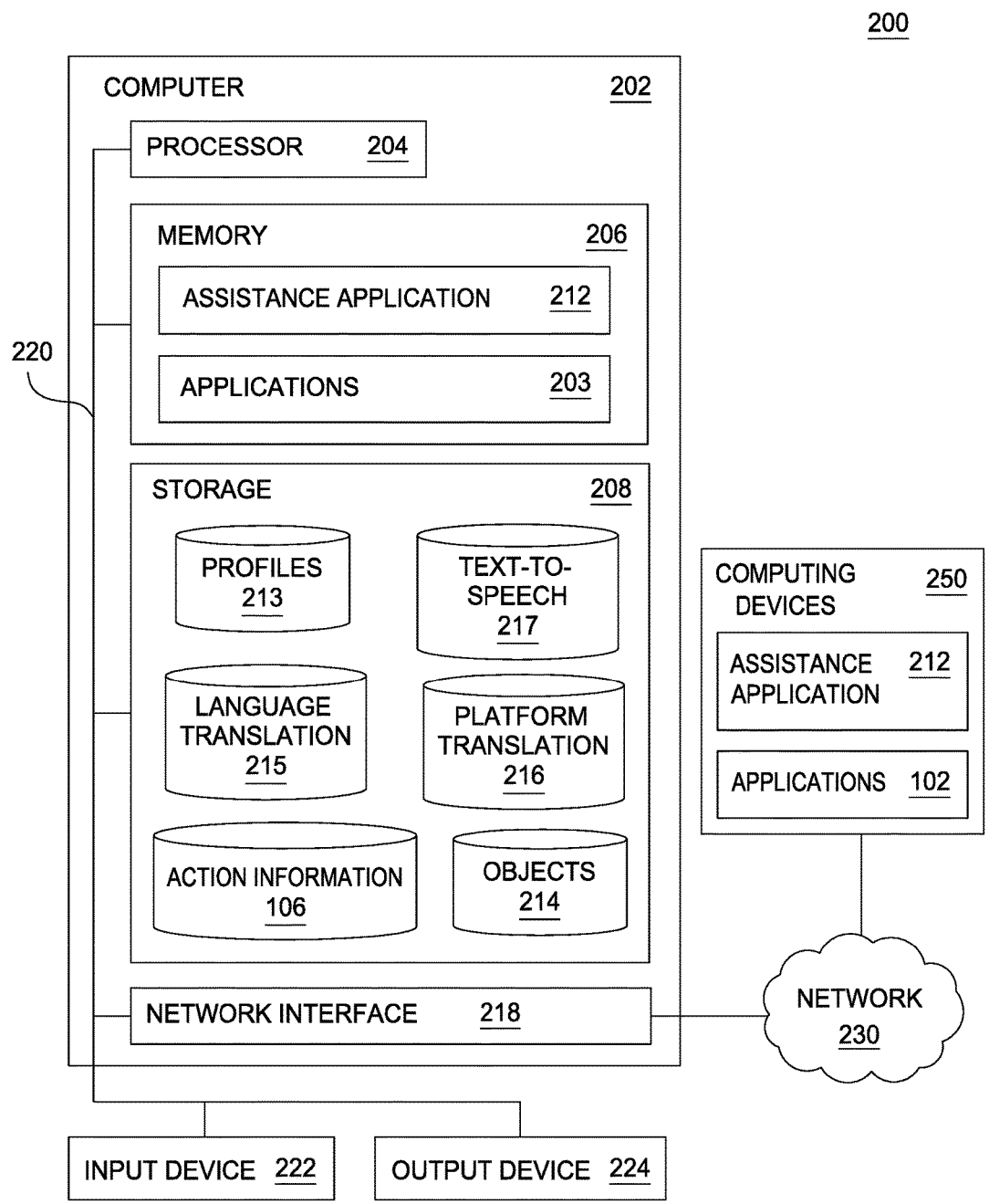
FIG. 2 is a block diagram illustrating a system which provides remote technology assistance through a dynamic flow of visual and auditory instructions, according to one embodiment.

FIG. 2 is a block diagram illustrating a system 200 which provides remote technology assistance through a dynamic flow of visual and auditory instructions, according to one embodiment. The networked system 200 includes a computer 202. The computer 202 may also be connected to other computers via a network 230. In general, the network 230 may be a telecommunications network and/or a wide area network (WAN). In a particular embodiment, the network 230 is the Internet.

The computer 202 generally includes a processor 204 which obtains instructions and data via a bus 220 from a memory 206 and/or a storage 208. The computer 202 may also include one or more network interface devices 218, input devices 222, and output devices 224 connected to the bus 220. The computer 202 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 204 is a programmable logic device that performs instruction, logic, and mathematical processing, and may be representative of one or more CPUs. The network interface device 218 may be any type of network communications device allowing the computer 202 to communicate with other computers via the network 230.

The storage 208 is representative of hard-disk drives, solid state drives, flash memory devices, optical media and the like. Generally, the storage 208 stores application programs and data for use by the computer 202. In addition, the memory 206 and the storage 208 may be considered to include memory physically located elsewhere; for example, on another computer coupled to the computer 202 via the bus 220.

The input device 222 may be any device for providing input to the computer 202. For example, a keyboard and/or a mouse may be used. The input device 222 represents a wide variety of input devices, including keyboards, mice, controllers, and so on. Furthermore, the input device 222 may include a set of buttons, switches or other physical device mechanisms for controlling the computer 202. The output device 224 may include output devices such as monitors, touch screen displays, and so on.

As shown, the memory 206 contains a plurality of applications 203 and an assistance application 212. The applications 203 are representative of any type of computing application, such as web browsers, email applications, word processors, and the like. The assistance application 212 is generally configured to facilitate remote user assistance with visual and auditory instructions. For example, a user of the computing device 250 may execute an instance of the assistance application 212 to assist a user of the computer 202 in using one of the applications 203. Generally, the assistance application 212 captures actions performed by an assisting user and generates action information 106 describing the actions performed by the assisting user. The assistance application 212 may then transmit the assistance information 106 to the target device used by the user requiring assistance (e.g., the computer 202). The assistance application 212 may also create an animated GIF based on the display of the assisting device which records the on-screen actions performed by the assisting user, and outputs the animated GIF for the user requiring assistance. Furthermore, the assistance application 212 may generate text bubbles, sound clips, and any other type of auditory and/or graphical assistance tools based on the action information 106. The assistance application 212 may also leverage the platform translation 216 to convert platform-dependent actions to global actions that can be understood by other devices. The assistance application 212 may further translate the assistance tools to a preferred language of the assisting user based on the language translation 215. The assistance application 212 may monitor the actions performed by the user receiving assistance, and determine whether the user successfully completes each action in the action information 106. Doing so allows the assistance application 212 to provide stages of assistance that guide the user through a multi-stage process when learning how to use computer technology. Furthermore, when assisting a user, the assistance application 212 may group related actions together (e.g., identifying a web browser icon and clicking the icon to open the web browser), so as to not overwhelm the user with too many instructions.

As shown, the storage 208 contains the action information 106, profiles 213, objects 214, a language translation 215, a platform translation 216, and a text-to-speech 217. As described above, the action information 106 includes metadata describing actions performed by an assisting user. The action information 106 may be stored on the assisting device and/or the target device (the device operated by the user requiring assistance). The action information 106 may include real-time actions performed by an assisting user, and may also include a complete set of previously recorded actions to assist users in "offline mode." In offline mode, the assisting user need not be active on the assisting computing device. Instead, the local assistance application 212 presents the actions in sequence to the user requiring assistance until all actions are completed. In some embodiments, the action information 106 includes predefined validation points, which are used to define a set of steps that must be performed by a user before a new set of instructions are outputted. For example, a validation point associated with FIG. 1A may require the user to click on the icon 104 prior to displaying the assistance depicted in FIG. 1B. The assistance application 212 may further use the validation points in determining whether the target user has successfully completed an action.

The profiles 213 include user profiles for a plurality of users. The user profiles 213 may include various settings and parameters for each user, such as preferred languages, preferred methods of instruction (e.g., sound clips or text-based instructions), and the like. The objects 214 include auditory and visual objects that are used to provide user assistance. For example, the objects 214 may include sound clips, animated GIFs, text bubbles, tooltips, and the like. The objects 214 may include templates and/or completed objects. The objects 214 may include predefined objects as well as objects dynamically created by the assistance application 212.

The platform translation 216 includes mappings and rules that allow the assistance application 212 to convert platform-dependent information in the action information 106 from one platform to another. For example, the platform translation 216 may include entries and rules for mapping operating system calls in operating system X to corresponding operating system calls in operating system Y. The text-to-speech 217 is a data store used by the assistance application 212 to generate audio clips based on text. For example, the assistance application 212 may use the text-to-speech 117 to generate audio based on the action information 106 and/or objects 214.

The computing devices 250 are representative of any type of computing devices, such as the computing devices 101, 102. As shown, the assistance application 212 and a set of applications 203 execute on the computing devices 250. The instance of the assistance application 212 executing on the computer 202 and the computing devices 250 can be used by either an assisting user or a target user receiving assistance.

Figure 3:
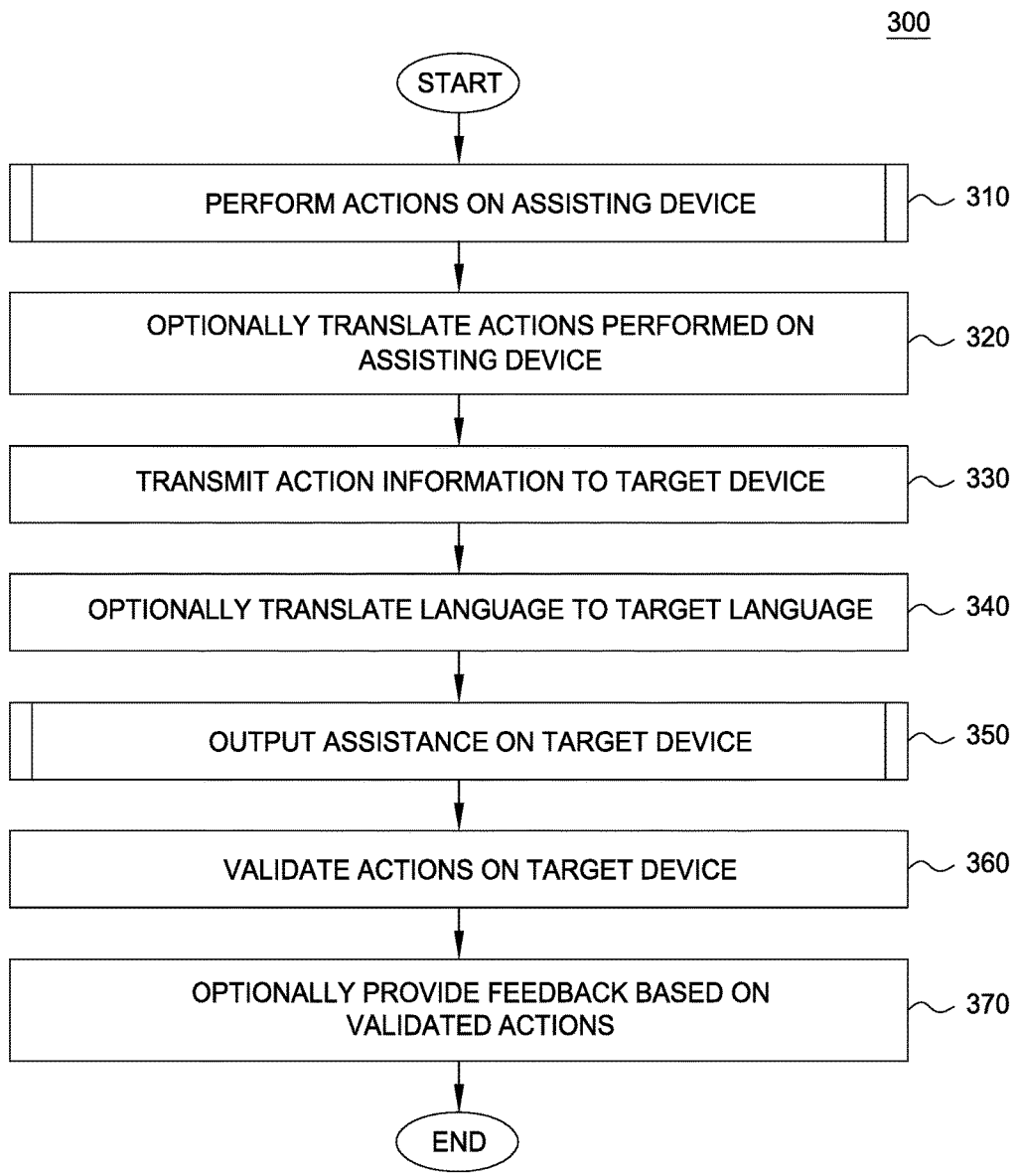
FIG. 3 is a flow chart illustrating an example method to provide remote technology assistance through a dynamic flow of visual and auditory instructions, according to one embodiment.

FIG. 3 is a flow chart illustrating an example method 300 to provide remote technology assistance through a dynamic flow of visual and auditory instructions, according to one embodiment. As shown, the method 300 begins at block 310, where an assisting user performs actions on an assisting device. In at least one embodiment, the assisting user may load the assistance application 212 prior to performing the actions at block 310. Example actions may include the assisting user opening an application store on a mobile device, searching for an application, specify to install the application, and accept license terms to install the application. At block 320, the assistance application 212 may optionally translate the actions performed on the assisting device to a format understood by the target device. For example, if the target device uses a different application store than the assisting device, the assistance application 212 may replace the application store application associated with the source device with the application store application associated with the target device.

At block 330, the assistance application 212 may transmit action information generated at block 310 for each action performed on the assisting device to the target device. At block 340, the assistance application 212 may optionally translate assistance information (e.g., text or audio stored in the objects 214) to a target language based on the preferred languages specified in the profile 213 of the target user. At block 350, described in greater detail with reference to FIG. 5, the assistance application 212 on the target device may output assistance on the target device. For example, in a first set of instructions, the assistance application 212 may identify the icon for the application store on the target device, and cause the target device to display the icon for the application store. The assistance application 212 may also create a text bubble telling the user to click on the icon, while a sound clip tells the user to click on the icon. An animated GIF may also show the assisting user's actions in navigating to the application store icon, and selecting the icon to open the application store, and so on.

At block 360, the assistance application 212 may validate the actions on the target device. Generally, the assistance application 212 may record actions performed by the user on the target device, and determine whether these actions satisfy a sequence of events listed in the action information 106. If the user successfully completes the required actions, the assistance application 212 may output the next set of instructions, including audio and visual tools. At block 370, a user and/or the assistance application 212 may optionally provide feedback based on the validated actions. For example, an instance of the assistance application 212 executing on the target device may provide an indication that the target user has or has not successfully completed the current actions. As another example, the target user may specify preferences as to the outputted assistance. For example, the target user may indicate that a sound clip including instructions was preferred to a text bubble.

Figure 4:
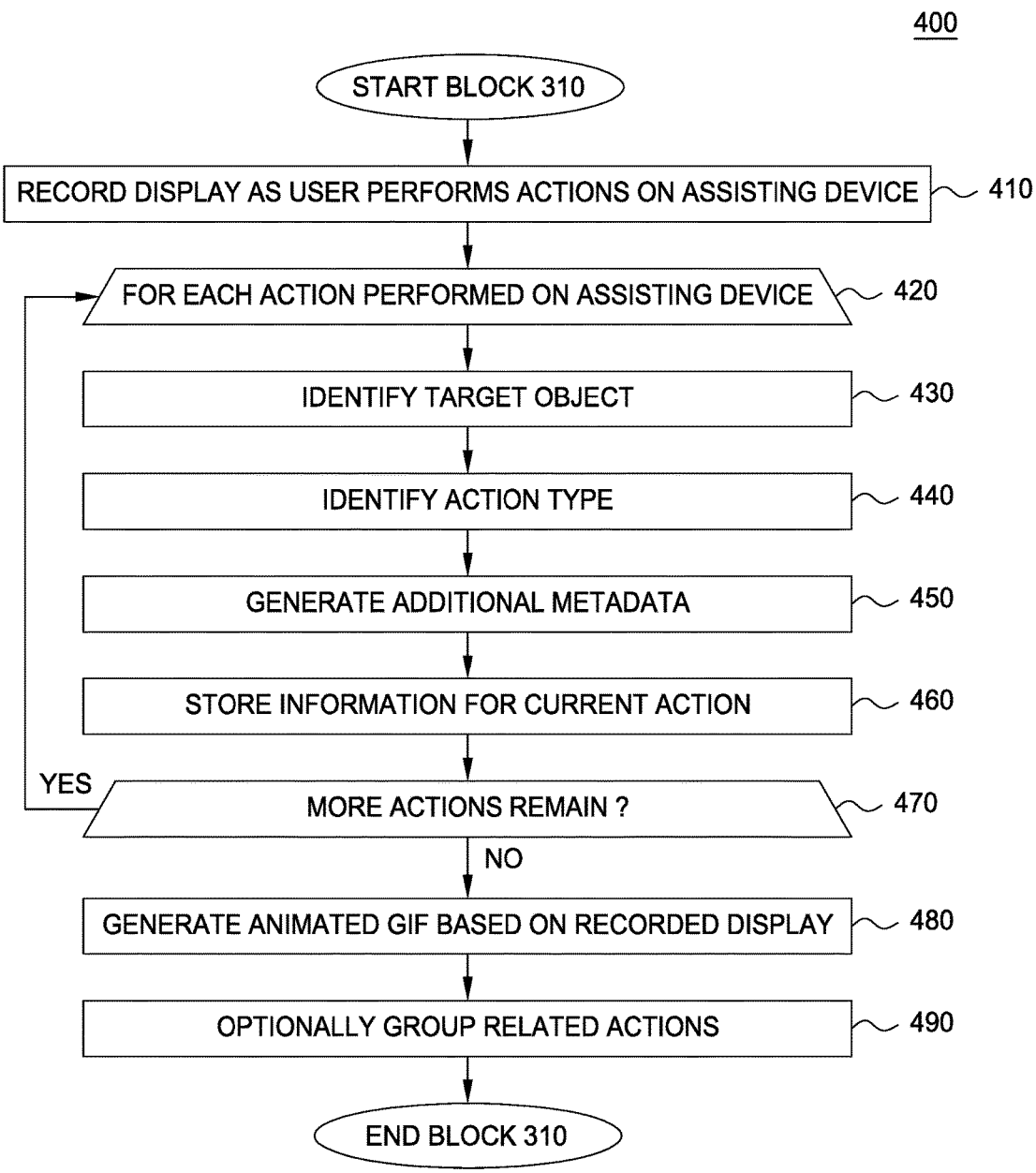
FIG. 4 is a flow chart illustrating an example method to perform actions on an assisting device, according to one embodiment.

FIG. 4 is a flow chart illustrating an example method 400 corresponding to block 310 to perform actions on an assisting device, according to one embodiment. As shown, the method 400 begins at block 410, where the assistance application 212 records the display of the assisting device as the assisting user performs actions on the assisting device. Doing so allows the assistance application 212 to generate an animated GIF showing the steps taken by the assisting user, which may be useful in instructing the target user. At block 420, the assistance application 212 executes a loop including blocks 430-470 for each action performed on the assisting device. At block 430, the assistance application 212 may determine a target object of the current action. In at least one embodiment, the target object of the current action is specified in the action information 106 for the current action received from the assisting user. The target object may be any type of object, such as an icon, uniform resource locator (URL), form button, application widget, input element, and the like. At block 440, the assistance application 212 may identify a type of the current action, such as opening a file, saving a file, opening an application, submitting a form, requesting remote content, and the like. At block 450, the assistance application 212 may generate additional metadata for the current action, such as system calls generated as part of executing the current action, a timestamp of the current action and/or system calls, and the like. At block 460, the assistance application 212 may store the information gathered at blocks 430-460 in the action information 106 for the current action. The assistance application 212 may further specify other information used to facilitate tutorial sessions, such as assisting and target users associated with the action information 106, applications associated with the action information 106, versions of the applications, and the like.

At block 470, the assistance application 212 determines whether any additional actions remain. If more actions remain, the assistance application 212 returns to block 420. Otherwise, the assistance application 212 proceeds to block 480, where the assistance application 212 generates the animated GIF based on the recorded display. At block 490, the assistance application 212 may optionally group related actions, and define validation points for the grouped actions. If the assistance application 212 groups related actions, the assistance application 212 may update the action information 106 to reflect the groupings and/or validation points. Doing so allows the assistance application 212 on the target device to output assistance in smaller steps so as to avoid overwhelming the target user.

Figure 5:
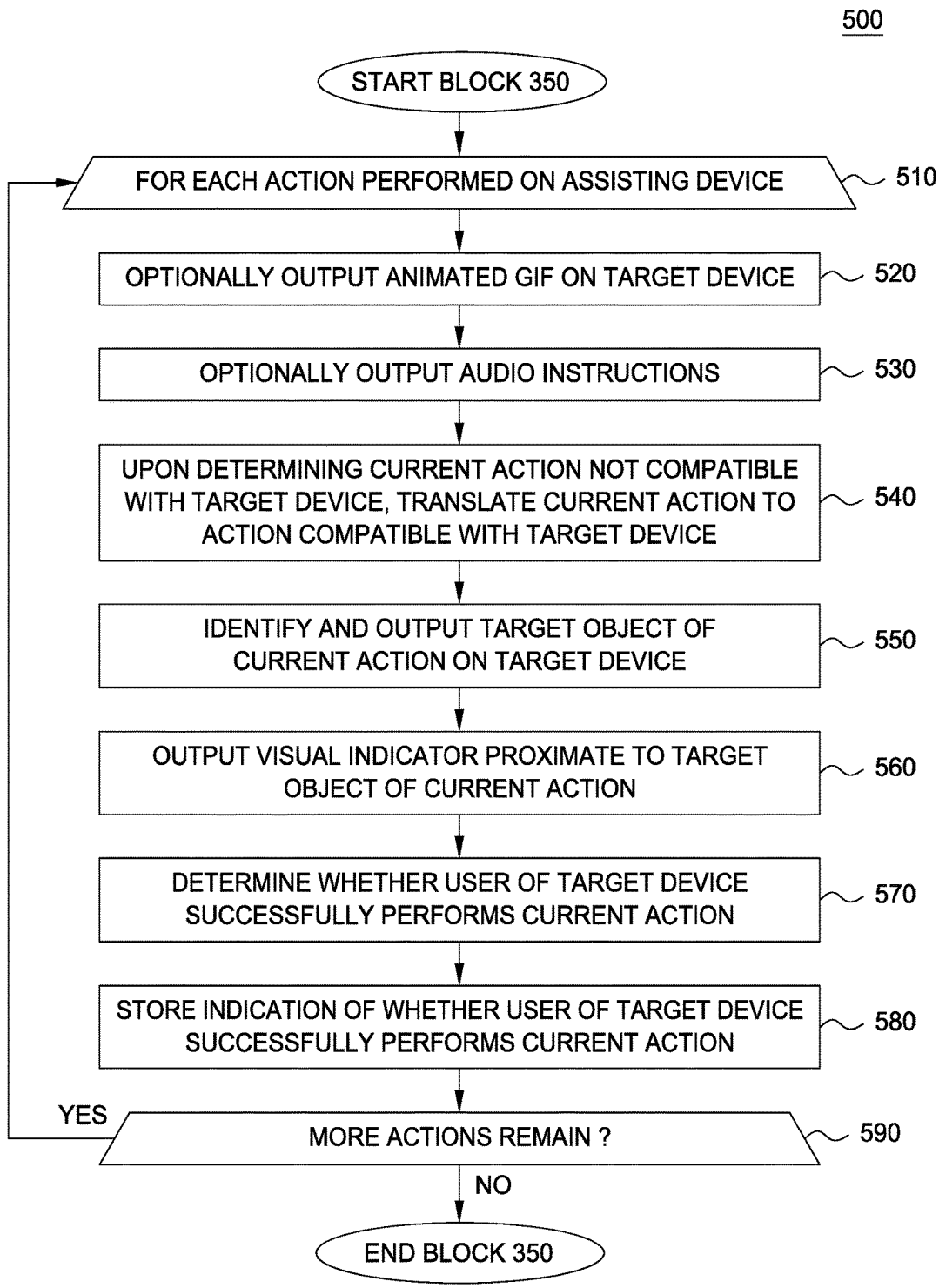
FIG. 5 is a flow chart illustrating an example method to output assistance on a target device, according to one embodiment.

FIG. 5 is a flow chart illustrating an example method 500 corresponding to block 350 to output assistance on a target device, according to one embodiment. As shown, the method begins at block 510, where the assistance application 212 executes a loop including blocks 520-590 for each action performed by the user of the assisting device and received by the target device. At block 520, the assistance application 212 optionally outputs an animated GIF for the current action on the display of the target device. As previously indicated, the animated GIF may reflect one or more actions performed by the assisting user. Therefore, the animated GIF outputted at block 520 may depict the screen of the assisting user performing the current action and/or additional actions.

At block 530, the assistance application 212 optionally outputs audio instructions on a speaker of the target device. In one embodiment, the assisting user may speak instructions which are recorded by the associated computing device, and sent to the target device for outputting. For example, the user may speak "click on the icon to open the application," which is recorded as a digital audio file, transmitted to the target device, and outputted for the user needing assistance. In another embodiment, the audio instructions are stored in the objects 214 and selected by the assistance application 212 based on associations with the current action performed by the assisting device. In some embodiments, the assistance application 212 may output more than one audio instruction. For example, if the user does not correctly perform the current action after hearing audio instructions from the assisting user, the assistance application 212 may output a related audio file from the content 214 to further assist the user.

At block 540, the assistance application 212 translates the current action to an action compatible with the target device upon determining that the current action is not compatible with the target device. For example, a command specific to web browser Y may be translated to a command understood by web browser Z, where the assisting device executes web browser Y and the target device executes web browser Z. At block 550, the assistance application 212 may identify the target object of the current action and output the target object on the target device. For example, if a user is unaware as to where an application icon is located, the assisting user may submit a command showing the user how to open the application. The assistance application 212 may identify metadata attributes (e.g., name, location, and target object) of the icon in the action information 106, and use these attributes to identify the corresponding icon on the target device.

At block 560, the assistance application 212 may output a visual indicator proximate to the target object of the current action. For example, the visual indicator may be a text bubble, graphic, text enhancement, and the like, which draws the user's attention to the target object. At block 570, the assistance application 212 determines whether the user of the target device successfully performs the current action. To determine whether the user successfully performed the current action, the assistance application 212 may monitor the system stack to identify a corresponding function specified in the action information 106 for the current action, identify function calls invoked by the application and/or operating system, and the like. At block 580, the assistance application 212 may store an indication of whether the user successfully performed the current action on the target device. In at least one embodiment, if the user does not successfully perform the current action, the assistance application 212 may return to block 520 to output additional assistance to the user in the form of visual and audio indicators. At block 590, the assistance application 212 determines whether additional assistance actions remain. If more actions remain, the assistance application 212 returns to block 510, otherwise the method 500 ends.

Advantageously, embodiments disclosed herein provide techniques to remotely provide assistance to users of computing devices. Embodiments disclosed herein provide visual cues in the form of animated GIFs depicting the necessary steps needed to complete desired computing actions, visual indicators which identify target objects and required user actions for the target objects, and audio instructions that a user can listen to for assistance. Furthermore, the assistance may be provided in any number of languages. Advantageously, embodiments disclosed herein improve the field of assistive technology by facilitating assistance from remote users (or offline assistance) and providing the necessary tools required by different users to learn new computing tasks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the user assistance application 212 could execute on a computing system in the cloud. In such a case, the assistance application 212 may translate platform specific action information to action information understood by a target device at a storage location in the cloud. Similarly, the assistance application 212 could translate the language of instructions (auditory or visual) to a preferred language of a target user. Doing so allows a user and instances of the assistance application 212 to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
   receiving, by a first device, action information describing a first action of a plurality of actions performed on a second device, wherein the action information was generated based on system calls generated on the second device when a user performed the first action on a target object on the second device;
   identifying the target object on the second device based on metadata included in the action information;
   determining one or more attributes of the target object, based on the metadata included in the action information;
   identifying, based on the one or more attributes of the target object, a corresponding object on the first device;
   outputting, by the first device:
      a sequence of images depicting performance of the first action on the second device;
      a textual instruction proximate to the corresponding object, wherein the textual instruction specifies how to perform the first action on the corresponding object on the first device; and
      an audio instruction specifying how to perform the first action on the corresponding object on the first device; and
   upon determining the first action has successfully been performed on the corresponding object on the first device:
      transmitting an indication that the first action has successfully performed the first action on the corresponding object on the first device; and
      receiving, by the first device, action information describing a second action of the plurality of actions performed on the second device.

2. The method of claim 1, wherein the audio and textual instructions are of a first language, the method further comprising:
   identifying a preferred language of a user stored in a user profile of the user, wherein the user is associated with the first device, wherein the first language is different than the preferred language; and
   prior to the outputting:
      translating the textual instruction from the first language to the preferred language of the user; and
      translating the audio instruction from the first language to the preferred language of the user, wherein the textual and audio instructions are outputted in the preferred language of the user.

3. The method of claim 1, further comprising prior to identifying the target object of the first action:

determining that the first action is specific to at least one of an operating system and an application of the second device; and translating the first action to a format compatible with at least one of an operating system and an application of the first device.

4. The method of claim 1, further comprising:

determining that a user of the first device has not successfully performed the second action on the first device;

transmitting an indication to a user of the second device that the user has not successfully performed the second action on the first device;

receiving, from the user of the second device, an updated textual instruction and an updated audio instruction; and outputting, to the user of the first device, the updated textual instruction and the updated audio instruction.

5. The method of claim 1, wherein determining that the first action has been successfully performed on the corresponding object on the first device comprises at least one of: (i) monitoring a system stack of the first device, (ii) identifying one or more function calls invoked on the first device, or (iii) analyzing image data of a screenshot of the first device.

6. The method of claim 1, further comprising:

generating the textual instruction based on at least one of: (i) text provided by a user of the second device, (ii) the metadata describing the first action, and (iii) a data store associating a stored text with the first action; and generating the audio instruction based on at least one of: (i) a voice instruction provided by the user of the second device, (ii) a text-to-speech algorithm applied to the metadata describing the first action, and (iii) a data store associating an audio file with the first action.

7. The method of claim 1, wherein the sequence of images are received from the second device, wherein the sequence of images comprise a sequence of screenshots of a display of the second device, wherein the outputting of the sequence of images is repeated on a display of the first device until a user of the first device successfully performs the first action on the first device.

8. A computer program product, comprising:

a computer-readable storage medium having computer readable program code embodied therewith, the computer readable program code executable by a processor to perform an operation comprising:

receiving, by a first device, action information describing a first action of a plurality of actions performed on a second device, wherein the action information was generated based on system calls generated on the second device when a user performed the first action on a target object on the second device;

identifying the target object on the second device based on metadata included in the action information;

determining one or more attributes of the target object, based on the metadata included in the action information;

identifying, based on the one or more attributes of the target object, a corresponding object on the first device;

outputting, by the first device:

a sequence of images depicting performance of the first action on the second device;

a textual instruction proximate to the corresponding object, wherein the textual instruction specifies how to perform the first action on the corresponding object on the first device; and an audio instruction specifying how to perform the first action on the corresponding object on the first device; and upon determining the first action has successfully been performed on the corresponding object on the first device:

transmitting an indication that the first action has successfully performed the first action on the corresponding object on the first device; and receiving, by the first device, action information describing a second action of the plurality of actions performed on the second device.

9. The computer program product of claim 8, wherein the audio and textual instructions are of a first language, the operation further comprising:

identifying a preferred language of a user stored in a user profile of the user, wherein the user is associated with the first device, wherein the first language is different than the preferred language; and prior to the outputting:

translating the textual instruction from the first language to the preferred language of the user; and translating the audio instruction from the first language to the preferred language of the user, wherein the textual and audio instructions are outputted in the preferred language of the user.

10. The computer program product of claim 8, the operation further comprising prior to identifying the target object of the first action:

determining that the first action is specific to at least one of an operating system and an application of the second device; and translating the first action to a format compatible with at least one of an operating system and an application of the first device.

11. The computer program product of claim 8, the operation further comprising:

determining that a user of the first device has not successfully performed the second action on the first device;

transmitting an indication to a user of the second device that the user has not successfully performed the second action on the first device;

receiving, from the user of the second device, an updated textual instruction and an updated audio instruction; and outputting, to the user of the first device, the updated textual instruction and the updated audio instruction.

12. The computer program product of claim 8, wherein determining that the first action has been successfully performed the corresponding object on the first device comprises at least one of: (i) monitoring a system stack of the first device, (ii) identifying one or more function calls invoked on the first device, or (iii) analyzing image data of a screenshot of the first device.

13. The computer program product of claim 8, the operation further comprising:

generating the textual instruction based on at least one of: (i) text provided by a user of the second device, (ii) the metadata describing the first action, and (iii) a data store associating a stored text with the first action; and generating the audio instruction based on at least one of: (i) a voice instruction provided by the user of the second device, (ii) a text-to-speech algorithm applied to the metadata describing the first action, and (iii) a data store associating an audio file with the first action.

14. The computer program product of claim 8, wherein the sequence of images are received from the second device, wherein the sequence of images comprise a sequence of screenshots of a display of the second device, wherein the outputting of the sequence of images is repeated on a display of the first device until a user of the first device successfully performs the first action on the first device.

15. A system, comprising:
a processor; and
a memory storing one or more instructions which, when executed by the processor, performs an operation comprising:
  receiving, by the system, action information describing a first action of a plurality of actions performed on a first device, wherein the action information was generated based on system calls generated on the first device when a user performed the first action on a target object on the first device;
  identifying the target object on the first device based on metadata included in the action information;
  determining one or more attributes of the target object, based on the metadata included in the action information;
  identifying, based on the one or more attributes of the target object, a corresponding object on the system;
  outputting, by the system:
    a sequence of images depicting performance of the first action on the system;
    a textual instruction proximate to the corresponding object, wherein the textual instruction specifies how to perform the first action on the corresponding object on the system; and
    an audio instruction specifying how to perform the first action on the corresponding object on the system; and
  upon determining the first action has successfully been performed on the corresponding object on the system:
    transmitting an indication that the first action has successfully performed the first action on the corresponding object on the system; and
    receiving, by the system, action information describing a second action of the plurality of actions performed on the first device.

16. The system of claim 15, wherein the audio and textual instructions are of a first language, the operation further comprising:
  identifying a preferred language of a user stored in a user profile of the user, wherein the user is associated with the system, wherein the first language is different than the preferred language; and
  prior to the outputting:
    translating the textual instruction from the first language to the preferred language of the user; and
    translating the audio instruction from the first language to the preferred language of the user, wherein the textual and audio instructions are outputted in the preferred language of the user.

17. The system of claim 15, the operation further comprising prior to identifying the target object of the first action:
  determining that the first action is specific to at least one of an operating system and an application of the first device; and
  translating the first action to a format compatible with at least one of an operating system and an application of the system.

18. The system of claim 15, the operation further comprising:
  determining that a user of the system has not successfully performed the second action on the system;
  transmitting an indication to a user of the first device that the user has not successfully performed the second action on the system;
  receiving, from the user of the first device, an updated textual instruction and an updated audio instruction; and
  outputting, to the user of the system, the updated textual instruction and the updated audio instruction.

19. The system of claim 15, wherein determining that the first action has been successfully performed on the corresponding object on the system comprises at least one of: (i) monitoring a system stack of the first device, (ii) identifying one or more function calls invoked on the first device, or (iii) analyzing image data of a screenshot of the first device.

20. The system of claim 15, wherein the sequence of images are received from the first device, wherein the sequence of images comprise a sequence of screenshots of a display of the first device, wherein the outputting of the sequence of images is repeated on a display device of the system until a user of the system successfully performs the first action on the system, wherein the operation further comprises:
  generating the textual instruction based on at least one of: (i) text provided by a user of the first device, (ii) the metadata describing the first action, and (iii) a data store associating a stored text with the first action; and
  generating the audio instruction based on at least one of: (i) a voice instruction provided by the user of the first device, (ii) a text-to-speech algorithm applied to the metadata describing the first action, and (iii) a data store associating an audio file with the first action.

* * * * *